United States Patent
Herle (10) Patent No.: US 7,149,508 B2
(45) Date of Patent: Dec. 12, 2006

(54) SYSTEM AND METHOD FOR DELTA-BASED OVER-THE-AIR SOFTWARE UPGRADES FOR A WIRELESS MOBILE STATION

(75) Inventor: Sudhindra P. Herle, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 377 days.

(21) Appl. No.: 10/358,570

(22) Filed: Feb. 5, 2003

(65) Prior Publication Data
US 2004/0152455 A1 Aug. 5, 2004

(51) Int. Cl.
*H04M 3/00* (2006.01)

(52) U.S. Cl. ............. 455/418; 455/419; 717/171; 717/176

(58) Field of Classification Search ............. 455/418, 455/419, 67.11, 420, 423, 550.1; 717/171, 717/176
See application file for complete search history.

(56) References Cited

U.S. PATENT DOCUMENTS

| | | | |
|---|---|---|---|
| 5,446,888 A | 8/1995 | Pyne | |
| 5,564,051 A | 10/1996 | Halliwell et al. | |
| 5,634,052 A | 5/1997 | Morris | |
| 6,023,620 A * | 2/2000 | Hansson | 455/419 |
| 6,275,694 B1 * | 8/2001 | Yoshida et al. | 455/419 |
| 6,526,574 B1 | 2/2003 | Jones | |
| 6,754,895 B1 * | 6/2004 | Bartel et al. | 717/171 |
| 6,836,657 B1 * | 12/2004 | Ji et al. | 455/419 |
| 2003/0045277 A1 * | 3/2003 | Mittal | 455/419 |
| 2003/0119485 A1 * | 6/2003 | Ogasawara | 455/411 |
| 2003/0147369 A1 * | 8/2003 | Singh et al. | 370/338 |
| 2004/0111723 A1 * | 6/2004 | Moles et al. | 717/171 |

FOREIGN PATENT DOCUMENTS

WO   WO 98/56149   12/1998

OTHER PUBLICATIONS

"ReFLEX™ Protocol Specification Document", Motorola Messaging Systems Products Group, Mar. 16, 1998, pp. 1-249.
Andrew Tridgell et al., "The rsync Algorithm", Nov. 9, 1998, 11 pages.
Andrew Tridgell, "Efficient Algorithms for Sorting and Synchronization", Thesis submitted for the Degree of Doctor of Philosophy at the Australian National University, Apr. 2000.
Barron C. Housel et al., "WebExpress: A Client/Intercept Based System for Optimizing Web Browsing In A Wireless Environment", Mobile Networks and Applications 3 (1998) pp. 419-431.
Josh MacDonald, "Versioned File Archiving, Compression, and Distribution", University of California at Berkeley, Department of Electrical Engineering and Computer Sciences.

(Continued)

Primary Examiner—CongVan Tran

(57) ABSTRACT

A mobile station capable of being upgraded by a delta file received from a software upgrade server via a wireless network. The mobile station comprises: 1) a memory for storing an original image file and the delta file, wherein the delta file is suitable for upgrading the original image file; and 2) a controller for modifying the original image file according to instructions stored in the delta file to thereby generate an upgraded image file.

14 Claims, 4 Drawing Sheets

OTHER PUBLICATIONS

"FLEXsuite™ of Enabling Protocols", Motorola Communications Enterprise, Sep. 10, 1999, pp. 1-387.
Randal C. Burns, "Differential Compression: A Generalized Solution for Binary Files", Thesis submitted in partial satisfaction of the requirements for the Degree of Master of Science in Computer Science. University of California Santa Cruz.
Zheng Wang et al., "BMAT—A Binary Matching Tool", pp. 1-10.
Brenda S. Baker et al., "Compressing Differences of Executable Code", Apr. 22, 1999, pp. 1-10.
Jeffrey C. Mogul et al., WRL Research Report 97/4a, "Potential Benefits of Delta Encoding and Data Compression for HTTP (Corrected Version)", Dec. 1997.
Burns, R., et al; "In-Place Reconstruction of Delta Compressed Files"; 9 pages.

* cited by examiner

SYSTEM AND METHOD FOR DELTA-BASED OVER-THE-AIR SOFTWARE UPGRADES FOR A WIRELESS MOBILE STATION

TECHNICAL FIELD OF THE INVENTION

The present invention is directed generally to wireless communication systems and, more specifically, to an apparatus and method for upgrading the software in a wireless mobile station.

BACKGROUND OF THE INVENTION

In order to increase the wireless market to the greatest extent possible, wireless service providers and wireless equipment manufacturers constantly seek new ways to make wireless equipment and services as convenient, user-friendly, and affordable as possible. To that end, wireless service providers and the manufacturers of cell phones and other wireless mobile stations frequently work together to streamline procedures for enrolling and equipping new subscribers and for improving the services and equipment of existing subscribers.

One important aspect of these efforts involves over-the-air (OTA) provisioning and upgrading of wireless mobile stations, such as cell phones, wireless personal digital assistants (PDAs), wireless hand-held computers, two-way pagers, and the like. OTA provisioning is a relatively new feature that enables a new subscriber who purchases a new cell phone (or other mobile station) to set-up an account with a wireless service provider and to configure the phone for operation. The OTA provisioning procedure is mostly automated and does not require the new subscriber to visit a cell phone service center. Typically, the new subscriber removes the new cell phone from its box, calls a special purpose telephone number (given in the instructions), and performs an interactive provisioning procedure with an automated agent or a human service representative.

Over-the-air upgrading of wireless mobile stations also is a relatively new procedure that enables a subscriber to download and install upgraded software containing patches, bug fixes, and newer versions of mobile station software, including the operating system. The wireless service provider or the mobile station manufacturer, or both, may provide the upgraded software.

It has long been possible to download and to install software upgrades for a personal computer (PC) via the Internet. A personal computer has many resources available to perform a software upgrade, including dynamically linked libraries (DLLs), a memory management unit (MMU), and a large random access memory (RAM) space. A conventional PC software upgrade may be partitioned and downloaded to a personal computer as a group of shared objects. If one object file is corrupted or interrupted during transmission, only that object file needs to be re-transmitted. The object files that are properly received do not need to be re-transmitted. Once all object files are present, the operating system of the PC in conjunction with the memory management unit (MMU) loads all of the object files into RAM and re-links the object files to form a DLL.

However, a wireless mobile station (e.g., a cell phone) typically has far fewer resources available than a PC. Typically, mobile stations lack a memory management unit and code is not executed from RAM. Code is executed out of a Flash memory that acts as a read-only memory (ROM). The Flash memory generally cannot be written to, it can only be re-programmed with special command sequences. These resource limitations greatly complicate software upgrade operations in wireless mobile stations.

For example, one way to download new software to a mobile station is to download an entire new binary image file and store the new image file in temporary Flash memory. After the entire download is complete, the mobile station replaces the existing binary image file with the new image file. However, a single image file is too large to be reliably downloaded over an air link. Also, this method requires twice as much Flash memory, resulting in an increase in the cost of a cell phone.

Another way to download new software to a mobile station is to partition the software into small modules (DLLs). Each such DLL is dynamically linked on the cell mobile station at run-time.

However, this method requires an enormous engineering effort to partition the cell phone firmware into logical and manageable DLLs.

Also, multiple DLLs are difficult in terms of deployment and configuration management, since an error in the version information of a single DLL can render a cell phone unusable.

Therefore, there is a need in the art for improved systems and methods for performing automatic software upgrades of wireless handsets and other types of mobile stations. In particular, there is a need in the art for systems and methods for performing over-the-air software upgrades that require only small upgrade file sizes.

SUMMARY OF THE INVENTION

The objective of invention is to do Internet protocol (IP)-based over-the-air (OTA) software download (i.e., IOTA-SD) using a minimum sized delta file-based software upgrade. The present invention comprises two parts: 1) a utility application that generates the smallest possible binary difference ("delta file") between two versions of mobile station executable firmware; and 2) a software algorithm running on the mobile station that receives the binary delta file as input and applies it to the existing image file on the mobile station to transform the existing image file into a new image file.

For example, let $I_o$ be the old image (e.g., revision 1.0) and let $I_N$ be the new image (e.g., revision 1.1). $T(x,y)$ is the utility application that takes two images x and y and produces a delta file, $d_{xy}$. $P(d_{xy}, x)$ is the software algorithm that takes the is delta, $d_{xy}$, and an image x, and reconstructs the new image file y. The new image file y is a bit exact copy of the original image file y used by $T(x,y)$.

The present invention comprises the following steps:
1) Compute $d_{xy}=T(I_O, I_N)$ on a host workstation or server;
2) Send $d_{xy}$ over the air to the mobile station. For typical cases, the size of $d_{xy}$ is much smaller than size of $I_N$.
3) Execute the software algorithm $P(d_{xy}, I_o)$ on the phone. The output of $P(d_{xy}, I_o)$ is the bit exact representation of image $I_N$.

Advantageously, the present invention downloads a small delta file over the air to the mobile station, rather than a large image file. The present invention also does not require twice the Flash memory.

Therefore, to address the above-discussed deficiencies of the prior art, it is a primary object of the present invention to provide a mobile station capable of being upgraded by a delta file received from a software upgrade server via a wireless network. According to an advantageous embodiment of the present invention, the mobile station comprises: 1) a memory capable of storing an original image file and the delta file, wherein the delta file is suitable for upgrading the original image file; and 2) a controller capable of modifying the original image file according to instructions stored in the delta file to thereby generate an upgraded image file.

According to one embodiment of the present invention, the controller is capable of communicating with the software upgrade server via the wireless network, wherein the controller transmits to the software upgrade server a version indicia identifying a current version of the original image file.

According to another embodiment of the present invention, the controller transmits the version indicia to the software upgrade server in response to a notification message received from the upgrade server.

According to still another embodiment of the present invention, the controller transmits the version indicia to the software upgrade server in response to a user prompt received from an operator of the mobile station.

According to yet another embodiment of the present invention, the controller transmits the version indicia to the software upgrade server in response to expiration of a timer.

According to a further embodiment of the present invention, the delta file comprises a file size associated with the new image file.

According to a still further embodiment of the present invention, the delta file comprises at least one checksum value associated with the new image file.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
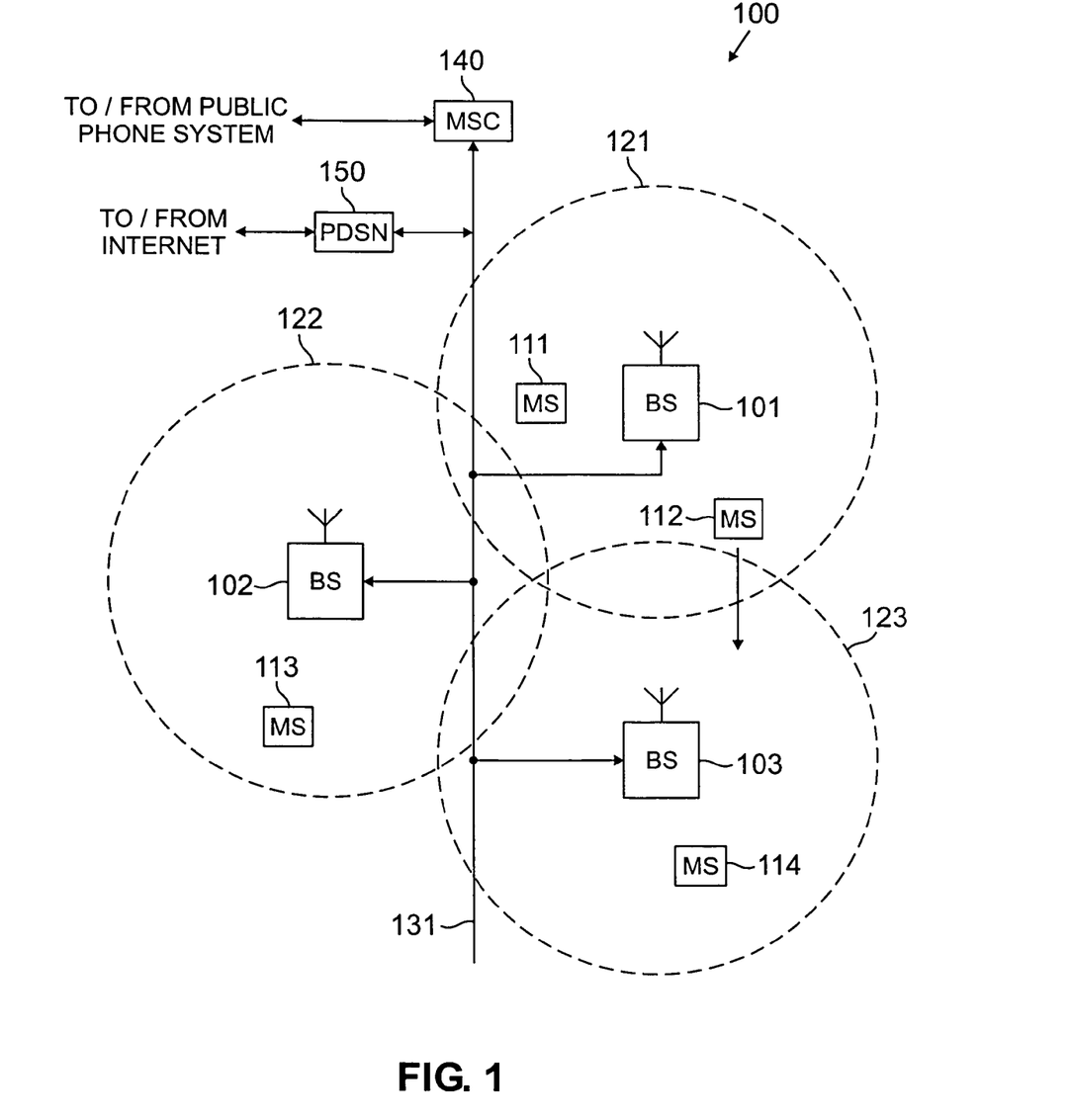
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 communicate with a plurality of mobile stations (MS) 111–114 over multiple access channels. Mobile stations 111–114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on obstructions.

As is well known in the art, cell sites 121–123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical power supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center MSC) 140. BS 101, BS 102 and BS 103 also transfer data signals, such as packet data, with the Internet (not shown) via communication line 131 and packet data server node (PDSN) 150. Line 131 also provides the connection path to transfers control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the radio channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft hand-off assumes the mobile station is in a voice or data call. An idle hand-off is the hand-off between cells sites of a mobile station that is communicating in the control or paging channel.

Figure 3:
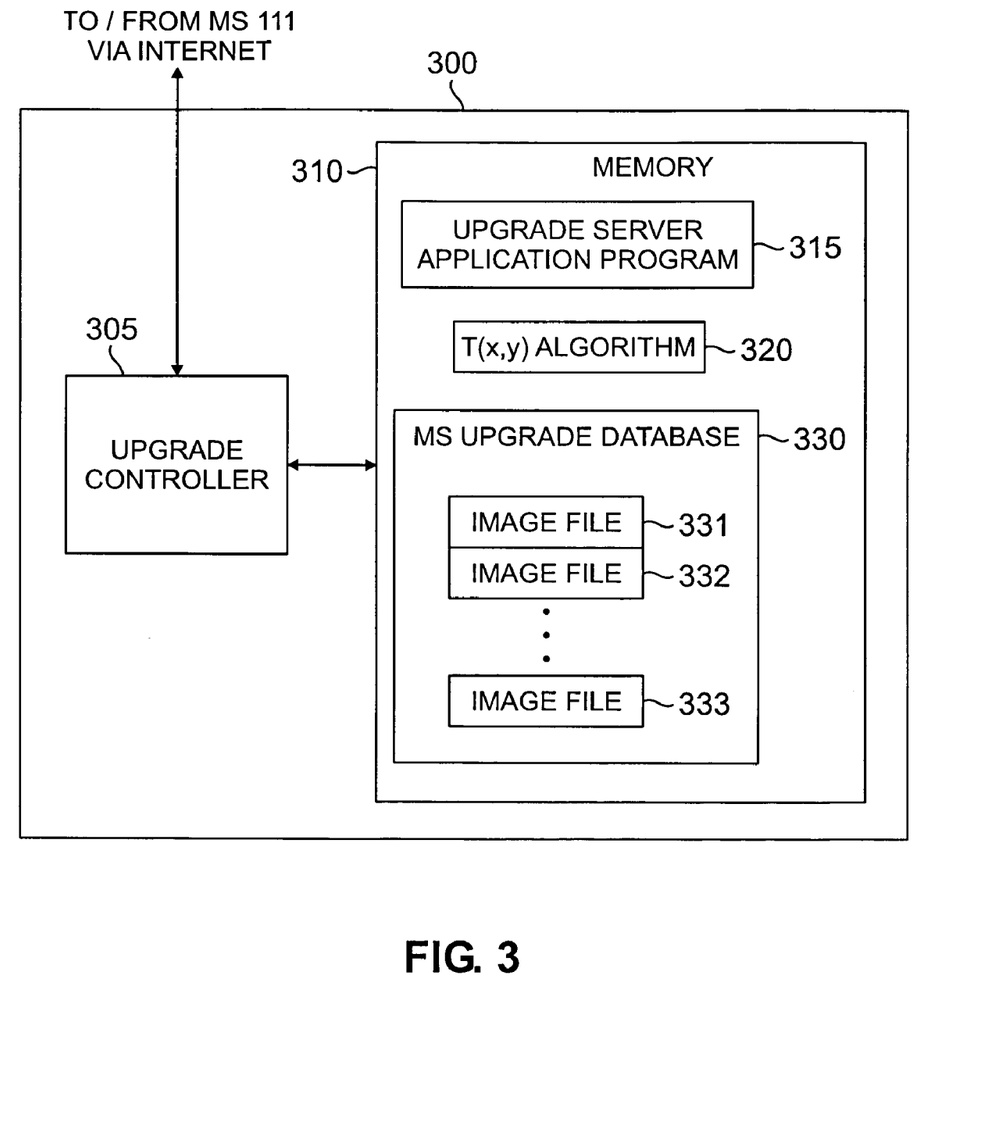
FIG. 3 illustrates an exemplary upgrade server according to one embodiment of the present invention.

Any or all of the mobile stations in wireless network 100 may be upgraded by means of an over-the-air (OTA) upgrade procedure that transfers new software to the mobile stations from remote upgrade server 300 shown in FIG. 3. According to the principles of the present invention, upgrade server 300 transmits a delta file ($d_{xy}$) to a mobile station (e.g., MS 111). The mobile station executes a software algorithm that reads instructions and data from the delta file. The software algorithm modifies, for example, the existing operating system software to produce a new (or upgraded) version of the operating system software.

Figure 2:
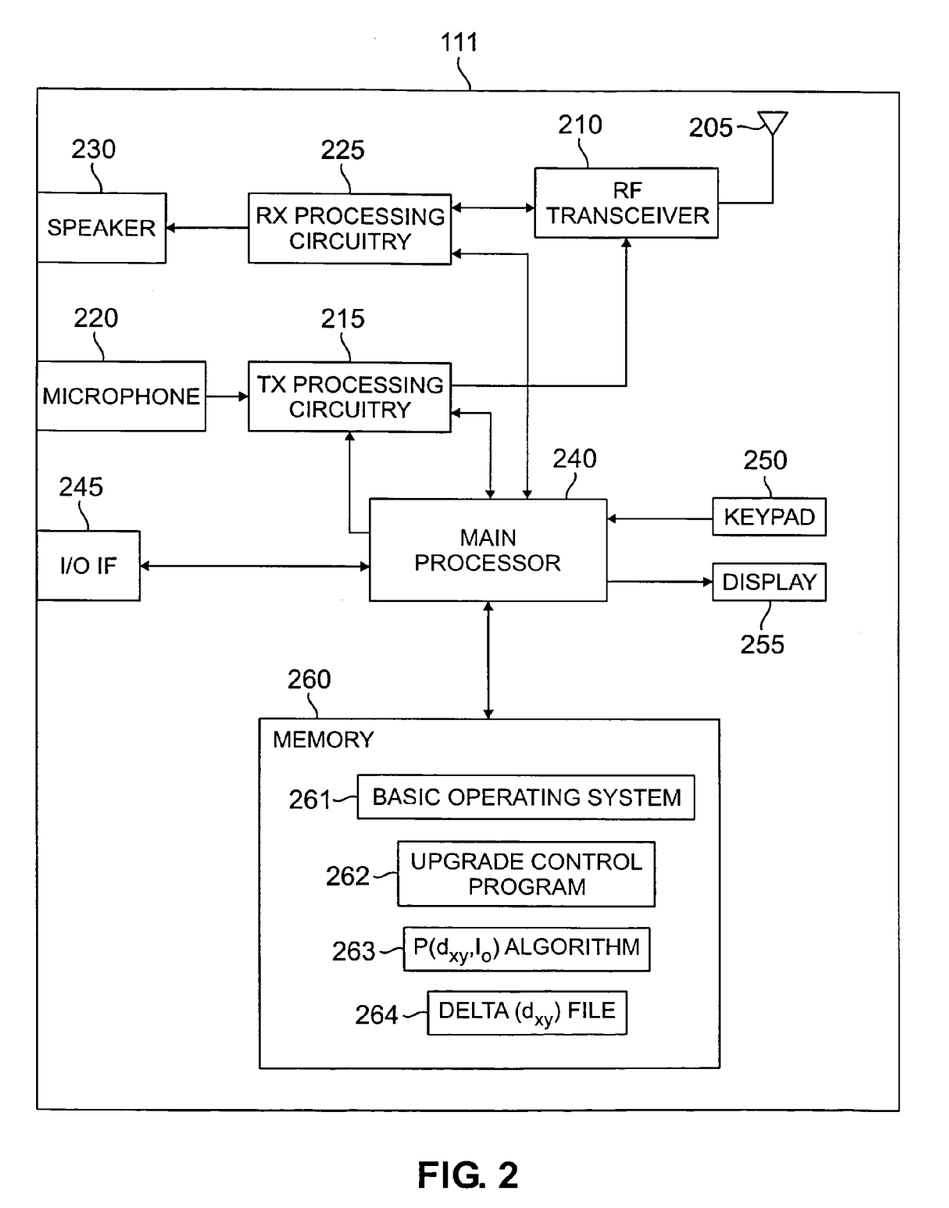
FIG. 2 illustrates an exemplary mobile station in greater detail according to one embodiment of the present invention.

FIG. 2 illustrates wireless mobile station 111 according to an advantageous embodiment of the present invention. Wireless mobile station 111 comprises antenna 205, radio frequency (RF) transceiver 210, transmit (TX) processing circuitry 215, microphone 220, and receive (RX) processing circuitry 225. MS 111 also comprises speaker 230, main processor 240, input/output (I/O) interface (IF) 245, keypad 250, display 255, and memory 260. Memory 260 further comprises basic operating system (OS) program 261, upgrade control program 262, $P(d_{xy}, I_o)$ algorithm program 263, and delta ($d_{xy}$) file 264.

Radio frequency (RF) transceiver 210 receives from antenna 205 an incoming RF signal transmitted by a base station of wireless network 100. Radio frequency (RF) transceiver 210 down-converts the incoming RF signal to produce an intermediate frequency (IF) or a baseband signal. The IF or baseband signal is sent to receiver (RX) processing circuitry 225 that produces a processed baseband signal by filtering, decoding, and/or digitizing the baseband or IF signal to produce a processed baseband signal. Receiver (RX) processing circuitry 225 transmits the processed baseband signal to speaker 230 (i.e., voice data) or to main processor 240 for further processing (e.g., web browsing).

Transmitter (TX) processing circuitry 215 receives analog or digital voice data from microphone 220 or other outgoing baseband data (e.g., web data, e-mail, interactive video game data) from main processor 240. Transmitter (TX) processing circuitry 215 encodes, multiplexes, and/or digitizes the outgoing baseband data to produce a processed baseband or IF signal. Radio frequency (RF) transceiver 210 receives the outgoing processed baseband or IF signal from transmitter (TX) processing circuitry 215. Radio frequency (RF) transceiver 210 up-converts the baseband or IF signal to a radio frequency (RF) signal that is transmitted via antenna 205.

In an advantageous embodiment of the present invention, main processor 240 is a microprocessor or microcontroller. Memory 260 is coupled to main processor 240. According to an advantageous embodiment of the present invention, part of memory 260 comprises a random access memory (RAM) and another part of memory 260 comprises a Flash memory, which acts as a read-only memory (ROM).

Main processor 240 executes basic operating system (OS) program 261 stored in memory 260 in order to control the overall operation of wireless mobile station 111. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Main processor 240 is capable of executing other processes and programs resident in memory 260. Main processor 240 can move data into or out of memory 260, as required by an executing process. Main processor 240 is also coupled to I/O interface 245. I/O interface 245 provides mobile station 111 with the ability to connect to other devices such as laptop computers and handheld computers. I/O interface 245 is the communication path between these accessories and main controller 240.

Main processor 240 is also coupled to keypad 250 and display unit 255. The operator of mobile station 111 uses keypad 250 to enter data into mobile station 111. Display 255 may be a liquid crystal display capable of rendering text and/or at least limited graphics from web sites. Alternate embodiments may use other types of displays.

In accordance with the principles of the present invention, main processor 240 is also capable of receiving and installing software upgrades under the control of upgrade control program 262. The OTA upgrade procedure may be initiated in any conventional triggering event, such an operator-initiated action, an automated periodic procedure (i.e., expiration or a timer in MS 111), or receipt of a notification message from upgrade server 300. In response to any of these triggering events, main processor 240 establishes a communication link to wireless network 100 and to server 300 via the Internet connection of wireless network 100.

When the communication link is established, main processor 240 may request a list of available upgrades for a mobile station of its type. Upgrade server 300 responds with a list of upgrade programs. Alternatively, when the communication link is established, upgrade server 300 may simply tell main processor 240 that a software upgrade file is available and ready to be transmitted.

According to the principles of the present invention, the upgraded software is sent to mobile station 111 in the form of delta ($d_{xy}$) file 264 that is stored in memory 264. Next, $P(d_{xy}, I_O)$ algorithm program 263 takes delta file 264 as its input and applies it to an original image file, $I_O$, that is already installed on MS 111 to produce a new image file, $I_N$. For example, the $I_O$ image file may be basic operating system program 261, if the operating system is being upgraded. An upgrade is accomplished by executing $P(d_{xy}, I_O)$ algorithm program 263 from Flash memory and modifying basic operating system 261 to produce an upgraded image file, $I_N$. Thereafter, MS 111 executes the upgraded version of basic operating system program 261.

FIG. 3 illustrates exemplary upgrade server 300 according to one embodiment of the present invention. Upgrade server 300 comprises upgrade controller 305 and memory 310. Memory 310 stores application programs and data associated with the operation of upgrade server 300, including upgrade server application program 315, T(x,y) utility algorithm program 320, and mobile station (MS) upgrade database 330. MS upgrade database 330 comprises a plurality of image files associated with mobile station 111, including exemplary image files 331, 332, and 333.

Upgrade controller 305 operates under the control of upgrade server application program 315 to provide software upgrade services for mobile stations in wireless network 100. Upgrade server application program 315 communicates with main processor 240 in MS 111. Upgrade server application program 315 receives requests for upgrades from MS 111 and/or informs MS 111 that an upgrade is available. Upgrade server application program 315 identifies available upgrades in MS upgrade database 330 according to the vendor and model of MS 111, or some similar criteria.

Upgrade server application program 315 also receives the current version number of a software application on MS 111. Upgrade server application program 315 uses the current version number to identify an original (or current) image file ($I_O$) and a new (or upgraded) image file ($I_N$) in MS upgrade database 330. Upgrade server application program 315 then executes T(x,y) utility algorithm program 320 on $I_O$ and $I_N$ to produce delta file ($d_{xy}$) file 264 for transmission to MS 111. Delta file 264 is transferred to upgrade controller 305, which relays delta file 264 to MS 111 for an OTA download.

Figure 4:
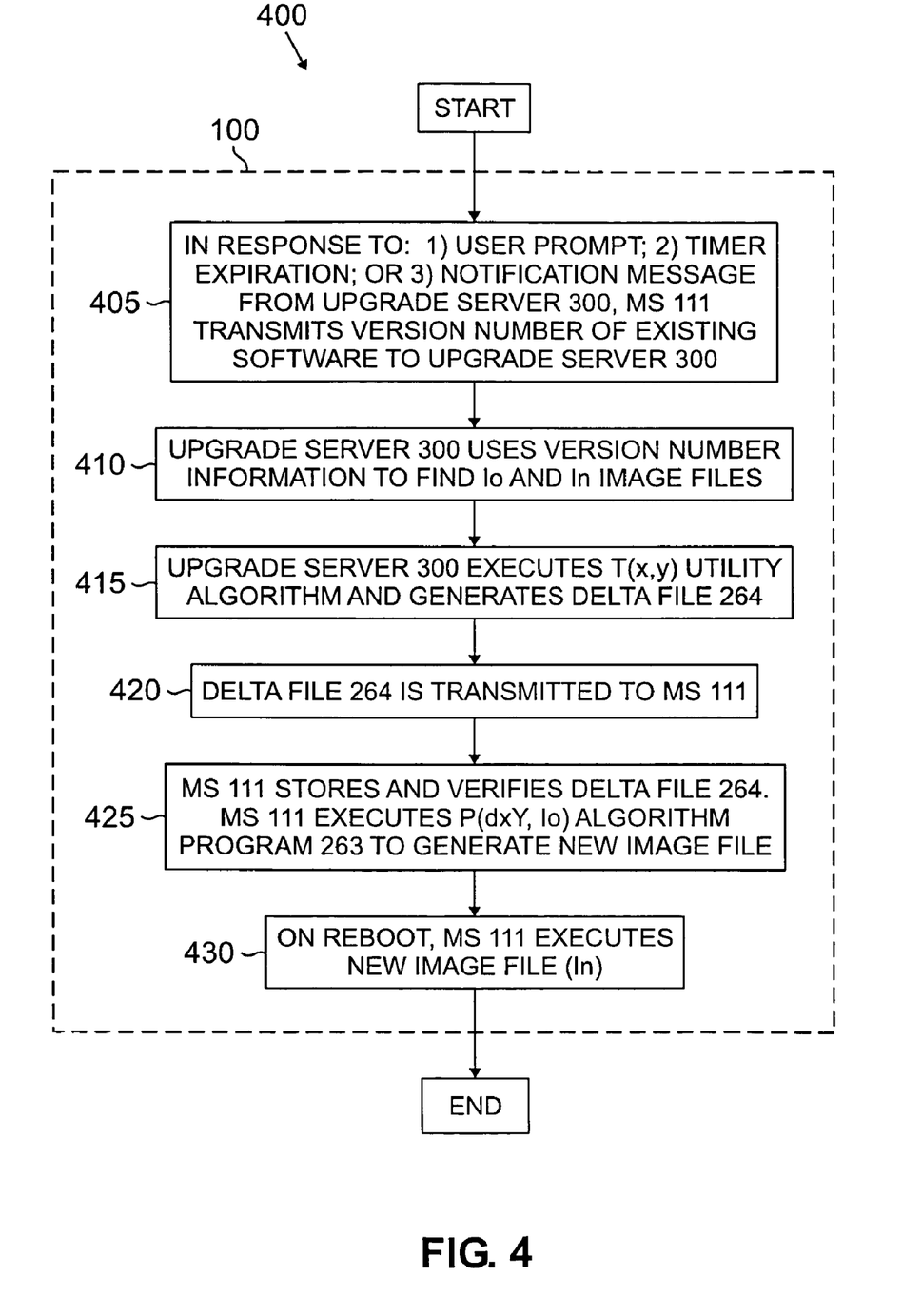
FIG. 4 is a flow diagram illustrating an upgrade operation of a mobile station according to an exemplary embodiment of the present invention.

FIG. 4 depicts flow diagram 400, which illustrates an upgrade operation of mobile station 111 via wireless network 100 according to an exemplary embodiment of the present invention. In response to one or more of: 1) a user prompt; 2) a timer expiration; or 3) a notification message from upgrade server 300, MS 111 transmits to upgrade server 300 information regarding the existing software versions residing in MS 111 (process step 405). Upgrade server 300 uses the version information to search MS upgrade database 330 and fetch the original image file, $I_O$, matching the version number. Upgrade server 300 also searches for a new (or upgrade) image file, IN, corresponding to the original image file, $I_O$, for that particular type of mobile station (process step 410).

Next, upgrade server 300 executes T(x,y) utility algorithm program 320 with x=$I_O$ and y=$I_N$ as inputs. The output is delta ($d_{xy}$) file 264 (process step 415). Optionally, in situations in which MS 111 does not already contain $P(d_{xy}, I_O)$ algorithm program 263, upgrade server 300 may add $P(d_{xy}, I_O)$ algorithm program 263 to delta file 264 in order to carry out the upgrade. Delta file 264 is then transmitted to MS 111 (process step 420). MS 111 receives delta file 264 and stores it in temporary non-volatile memory (i.e, Flash memory). Since the size of delta file 264 generally is very small compared to the size of either the $I_O$ image file or the IN image file, this does not present a memory problem.

After the entire delta ($d_{xy}$) file 264 is downloaded, MS 111 verifies delta ($d_{xy}$) file 264 for integrity, using MD5, HMAC-MD5, or some similar check-sum algorithm. Subsequently, MS 111 executes $P(d_{xy}, I_O)$ algorithm program 263. The original image file, $I_O$, is already present on MS 111. Execution of $P(d_{xy}, I_O)$ algorithm program 263 transforms the original image file, $I_O$ (i.e., operating system program 261), into an exact copy of the new image, $I_N$ (process step 425). After reboot, MS 111 executes the new (or upgraded) image file (process step 430).

According to an exemplary embodiment of the present invention, delta ($d_{xy}$) file 264 may contain the following essential information:

1) A cryptographic secure checksum of the new image $I_N$, which is verified after $P(d_{xy}, I_O)$ algorithm program 263 completes its operation;

2) The final size of $I_N$; and

3) Instructions to transform the old image file, $I_O$, into the new image file, $I_N$.

The instructions in delta ($d_{xy}$) file 264 may be, for example:

a) Add M bytes of literal data at offset N;

b) Copy data from original image at offset M to new offset N; and/or c) Delete N bytes of data at offset M.

Optionally, delta ($d_{xy}$) file 264 may be compressed to further reduce the OTA transfer size using any of a number of conventional algorithms, including LZW, GZIP, BZIP2, RLE, ZIP, and the like.

Alternatively, delta ($d_{xy}$) file 264 may be downloaded to a personal computer (PC) via the internet and MS 111 may be re-programmed via the serial port and special customer support software running on the PC. This alternative allows mass updates of software quickly and easily, since the entire software need not be programmed—only a small delta file.

Although the present invention has been described in detail, those skilled in the art should understand that it is possible to make various changes, substitutions and alterations herein without departing from the spirit and scope of the invention in its broadest form.

What is claimed is:

1. A mobile station capable of being upgraded by a delta file received from a software upgrade server via a wireless network, said mobile station comprising:
    a memory capable of storing an original image file, said delta file, and a first version indicia identifying a current version of said original image file, wherein said delta file is suitable for upgrading said original image file and said delta file is identified by a second version indicia; and
    a controller capable of modifying said original image file according to a comparison between said first version indicia and said second version indicia, and instructions stored in said delta file to thereby generate an upgraded image file.

2. The mobile station as set forth in claim 1 wherein said controller is capable of communicating with said software upgrade server via said wireless network, wherein said controller transmits to said software upgrade server said first version indicia identifying a current version of said original image file.

3. The mobile station as set forth in claim 2 wherein said controller transmits said first version indicia to said software upgrade server in response to a notification message received from said upgrade server.

4. The mobile station as set forth in claim 2 wherein said controller transmits said first version indicia to said software upgrade server in response to a user prompt received from an operator of said mobile station.

5. The mobile station as set forth in claim 2 wherein said controller transmits said first version indicia to said software upgrade server in response to expiration of a timer.

6. The mobile station as set forth in claim 2 wherein said delta file comprises a file size associated with said new image file.

7. The mobile station as set forth in claim 6 wherein said delta file comprises at least one checksum value associated with said new image file.

8. For use in a mobile station capable of being upgraded by a delta file received from a software upgrade server via a wireless network, a method of upgrading software in said mobile station comprising the steps of:
    receiving from said software upgrade server a delta file capable of upgrading an original image file stored in a memory of said mobile station;
    storing said delta file and a first version indicia identifying a current version of said original image file in said memory of said mobile station;
    comparing said first version indicia with a second version indicia identifying said delta file; and
    modifying said original image file according to said comparison and instructions stored in said delta file to thereby generate an upgraded image file.

9. The method as set forth in claim 8 further comprising the step of transmitting to said software upgrade server said first version indicia identifying a current version of said original image file.

10. The method as set forth in claim 9 wherein the step of transmitting said first version indicia to said software upgrade server is done in response to a notification message received from said upgrade server.

11. The method as set forth in claim 9 wherein the step of transmitting said first version indicia to said software upgrade server is done in response to a user prompt received from an operator of said mobile station.

12. The method as set forth in claim 9 wherein said step of transmitting said first version indicia to said software upgrade server is done in response to expiration of a timer.

13. The method as set forth in claim 9 wherein said delta file comprises a file size associated with said new image file.

14. The method as set forth in claim 13 wherein said delta file comprises at least one checksum value associated with said new image file.

* * * * *

UNITED STATES PATENT AND TRADEMARK OFFICE
CERTIFICATE OF CORRECTION

PATENT NO.       : 7,149,508 B2                                      Page 1 of 1
APPLICATION NO.  : 10/358570
DATED            : December 12, 2006
INVENTOR(S)      : Sudhindra P. Herle It is certified that error appears in the above-identified patent and that said Letters Patent is hereby corrected as shown below:

Column 2, line 47, delete "is" before the term "delta";

Column 8, line 24, delete "IN" and replace with --$I_N$--;

Column 8, line 37, delete "IN" and replace with --$I_N$--.

Signed and Sealed this

Seventeenth Day of April, 2007

JON W. DUDAS
*Director of the United States Patent and Trademark Office*